United States Patent
Barak

(10) Patent No.: US 11,194,909 B2
(45) Date of Patent: Dec. 7, 2021

(54) LOGICAL IDENTIFICATION OF MALICIOUS THREATS ACROSS A PLURALITY OF END-POINT DEVICES

(71) Applicant: Palo Alto Networks, Inc., Santa Clara, CA (US)

(72) Inventor: Gil Barak, Ra'anana (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 227 days.

(21) Appl. No.: 16/014,632

(22) Filed: Jun. 21, 2018

(65) Prior Publication Data

US 2018/0373870 A1    Dec. 27, 2018

Related U.S. Application Data

(60) Provisional application No. 62/522,718, filed on Jun. 21, 2017.

(51) Int. Cl.

| | |
|---|---|
| *G08B 23/00* | (2006.01) |
| *G06F 12/16* | (2006.01) |
| *G06F 12/14* | (2006.01) |
| *G06F 11/00* | (2006.01) |
| *G06F 21/56* | (2013.01) |
| *H04L 29/06* | (2006.01) |
| *G06F 16/14* | (2019.01) |
| *G06F 21/55* | (2013.01) |

(52) U.S. Cl.
CPC ............ *G06F 21/565* (2013.01); *G06F 16/14* (2019.01); *G06F 21/552* (2013.01); *H04L 63/145* (2013.01); *H04L 63/1425* (2013.01); *H04L 63/1433* (2013.01)

(58) Field of Classification Search
CPC ...... G06F 21/565; G06F 21/552; G06F 16/14; H04L 63/1425; H04L 63/1433; H04L 63/145
USPC ........................................................ 726/23
See application file for complete search history.

(56) References Cited

U.S. PATENT DOCUMENTS 7,757,283 B2    7/2010   Robert et al.
8,453,244 B2    5/2013   Dai et al.
(Continued)

OTHER PUBLICATIONS

Dr. Jordan Shropshire; A Measure for Assessing the Adequacy of DDOS Defenses; Proceedings of the Nineteenth Americas Conference on Information Systems, Chicago, Illinois, Aug. 15-17, 2013.*

*Primary Examiner* — Monjur Rahim
(74) *Attorney, Agent, or Firm* — Gilliam IP PLLC

(57) ABSTRACT

A computerized method for logical identification of malicious threats across a plurality of end-point devices (EPD) communicatively connected by a network, comprising collecting over the network an identifier associated with each file of a plurality of files, wherein each file of the plurality of files is installed on at least one of the plurality of EPDs and wherein the identifier is the same for each like file of the plurality of file. Information associated with an identified subset of files is collected, wherein the information indicates at least a time at which the at least one file was installed on one or more of the plurality of EPDs and the way the at least one file spread within the network. The collected information is analyzed according to a set of predetermined computerized investigation rules. The analysis is used to determine whether at least a file of the identified subset files is a suspicious file.

19 Claims, 4 Drawing Sheets

(56) References Cited

U.S. PATENT DOCUMENTS

| | | | |
|---|---|---|---|
| 8,479,290 B2 | 7/2013 | Viswanathan et al. | |
| 9,065,849 B1 * | 6/2015 | Rivera | H04L 63/1433 |
| 9,088,606 B2 | 7/2015 | Ranum et al. | |
| 9,185,119 B1 * | 11/2015 | Tamersoy | H04L 63/14 |
| 10,169,584 B1 * | 1/2019 | Roundy | G06F 21/566 |
| 10,230,749 B1 * | 3/2019 | Rostami-Hesarsorkh | G06F 21/56 |
| 2011/0258702 A1 * | 10/2011 | Olney | H04L 63/0218 726/24 |
| 2015/0381637 A1 | 12/2015 | Raff et al. | |
| 2016/0366168 A1 | 12/2016 | Cazin et al. | |
| 2017/0048272 A1 | 2/2017 | Yamamura et al. | |
| 2017/0053119 A1 | 2/2017 | Mankin et al. | |
| 2017/0099312 A1 | 4/2017 | Ganame et al. | |
| 2017/0235966 A1 * | 8/2017 | Ray | G06F 21/554 713/165 |
| 2017/0235967 A1 * | 8/2017 | Ray | H04L 63/02 713/165 |
| 2017/0251003 A1 * | 8/2017 | Rostami-Hesarsorkh | H04L 63/1425 |
| 2017/0302458 A1 * | 10/2017 | Berger | H04L 63/0428 |
| 2017/0302635 A1 * | 10/2017 | Humphries | H04L 63/083 |
| 2017/0302653 A1 * | 10/2017 | Ortner | H04L 63/0435 |
| 2017/0302696 A1 * | 10/2017 | Schutz | H04L 9/083 |
| 2017/0359370 A1 * | 12/2017 | Humphries | H04L 63/1416 |
| 2018/0007014 A1 * | 1/2018 | Neal | H04L 9/0891 |

* cited by examiner

LOGICAL IDENTIFICATION OF MALICIOUS THREATS ACROSS A PLURALITY OF END-POINT DEVICES

CROSS-REFERENCE TO RELATED APPLICATION

This patent application claims priority to U.S. Provisional Patent Application No. 62/522,718, filed on Jun. 21, 2017, which is hereby incorporated by reference in its entirety.

BACKGROUND

Field

The present disclosure generally relates to data security, and more specifically to a logical identification of malicious threats across a plurality of end-point devices (EPD) communicatively connected by a network.

Related Art

Nowadays, as organizations and enterprises get bigger, their systems and networks are more and more exposed to malicious attacks. Kaspersky® reports detections of over 300,000 different malware variants in a single day. The United Kingdom government reports over 100,000 cyber-attacks on British companies every day.

In order to identify such attacks, a number of different anti-virus applications are currently available. Such anti-virus applications force security teams of large enterprises to manage thousands of new alerts every day, when responding to a single alert may take days, weeks and sometimes months.

These applications must be deployed into a computerized environment and attempt to identify malicious activity within the network. Other solutions may also be known. For example, anti-virus solutions that detect and remove known viruses by identifying "signatures" of such viruses may be available.

The majority of these solutions rely upon a basic engine that searches suspect files for the presence of predetermined virus signatures. However, these related art solutions for identifying security incidents are not effective enough and malicious activity may go undetected.

Advanced persistent threat (APT) is a network attack in which an unauthorized person gains access to a network and stays there undetected for a long period of time. The intention of an APT attack is to steal data rather than to cause damage to the network or organization. APT attacks target organizations in sectors with high-value information, such as national defense, manufacturing and the financial industry.

In a simple attack, the intruder tries to get in and out as quickly as possible in order to avoid detection by the network's intrusion detection system (IDS). In an APT attack, however, the goal is not to get in and out but to achieve ongoing access. To maintain access without discovery, the intruder must continuously rewrite code and employ sophisticated evasion techniques. Some APTs are so complex that they require a full time administrator.

An APT attacker often uses spear fishing, a type of social engineering, to gain access to the network through legitimate means. Once access has been achieved, the attacker establishes a back door.

The next step is to gather valid user credentials (especially administrative ones) and move laterally across the network, installing more back doors. The back doors allow the attacker to install bogus utilities and create a "ghost infrastructure" for distributing malware that remains hidden in plain sight.

Therefore, such APTs are very hard to monitor and track. In the view of the shortcoming of related art, it would be advantageous to provide an efficient solution for detecting ATPs in a computerized environment. It would further be advantageous if such solution shall further enable logical identification of malicious threats across a plurality of end-point devices (EPD) communicatively connected by a network.

SUMMARY

To realize some of the advantages discussed above, there is provided a computerized method for logical identification of malicious threats across a plurality of end-point devices (EPD) communicatively connected by a network, comprising collecting over the network an identifier associated with each file of a plurality of files, wherein each file of the plurality of files is installed on at least one of the plurality of EPDs and wherein the identifier is the same for each like file of the plurality of file. Information associated with an identified subset of files is collected, wherein the information indicates at least a time at which the at least one file was installed on one or more of the plurality of EPDs and the way the at least one file spread within the network. The collected information is analyzed according to a set of predetermined computerized investigation rules. The analysis is used to determine whether at least a file of the identified subset files is a suspicious file.

In a specific enhancement said identifying the subset of files is based on determining a prevalence of each file of said plurality of files.

More specifically, the identifying is based on determining if each of the subset of files have a prevalence below a predetermined threshold.

In another specific enhancement, the identifier is based on information associated with the each file of the plurality of files.

More specifically, the information includes at least the file's name.

More specifically, the information includes at least the files' attribution.

In another specific enhancement the method further comprising continuously monitoring the information associated with each file of the plurality of files for identifying a suspicious file.

In yet another specific enhancement, the method further comprises generating a risk score based on the determination that the at least a file of the identified subset files is a suspicious file.

Another aspect of the disclosed teachings is an apparatus for logical identification of malicious threats across a plurality of end-point devices (EPD) communicatively connected by a network, comprising an interface to a network, a processing unit and a memory coupled to the processing unit, the memory contains therein instructions that when executed by the processing unit configures the apparatus to identify said malicious threats. The apparatus is configured to collect over the network an identifier associated with each file of a plurality of files, wherein each file of the plurality of files is installed on at least one of the plurality of EPDs and wherein the identifier is the same for each like file of the plurality of files. The apparatus is further configured to collect information associated with an identified subset of files, wherein the information indicates at least a time at which the at least one file was installed on one or more of the plurality of EPDs and the way the at least one file spread within the network. The collected information is analyzed according to a set of predetermined computerized investigation rules. The apparatus is configured to determine based on analysis of the collected information whether at least a file of the identified subset files is a suspicious file.

Yet another aspect of the disclosed teachings is a computerized method for logical identification of a root cause of malicious threats across a plurality of end-point devices (EPD) communicatively connected by a network, comprising receiving indication corresponding to a first file installed on a first EPD and a second file installed on a second EPD. A time pointer at which the second file was installed on the second EPD is retrieved. The network is searched for a recent communication between the first EPD and the second EPD that was executed prior to the time pointer. The time pointer and the results of the search of the recent communication with respect of at least one predetermined computerized investigation rule (CIR) are analyzed. The analysis is used to determine whether the first file caused the spreading of the second file.

In a specific enhancement the first file and the second file are identical and having an identical prevalence which is below a predetermined threshold.

In another specific enhancement the indication includes metadata associated with each of the first file and the second file.

In yet another specific enhancement the second file was installed on the second EPD after the first file was installed on the first EPD.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF EXEMPLARY EMBODIMENTS

Figure 1:
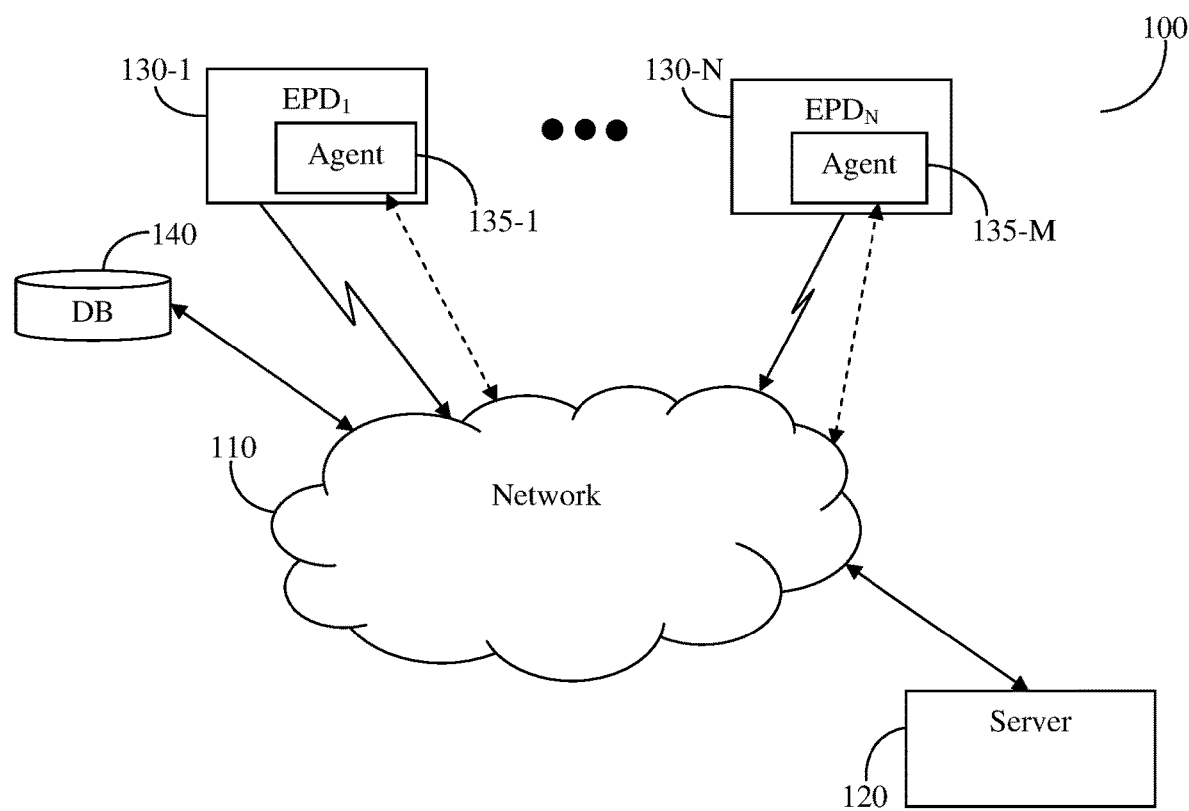
FIG. 1—is a block diagram of a network system used to describe the operation of the system according to an embodiment.

It is important to note that the embodiments and enhancements discussed herein are only examples of the many advantageous uses of the innovative teachings herein. In general, statements made in the specification of the present application do not necessarily limit any of the various claimed inventions. Moreover, some statements may apply to some innovative features but not to others. In general, unless otherwise indicated, singular elements may be in plural and vice versa with no loss of generality. In the drawings, like numerals refer to like parts through several views.

A system collects identifiers associated with a plurality of files that are installed on end-point devices (EPDs), the identifiers are the same for each like file of the plurality of files. The system determines based on the collected identifiers a prevalence of each file of the plurality of files and identifies a subset of files that have a prevalence that is below a predetermined threshold. The system collects information associated with the identified subset of files that indicates a time at which the at least one file was installed on one or more of the plurality of EPDs, the way the at least one file spread within the network, etc. The system then analyzes the collected information with respect of predetermined computerized investigation rules. Then the system determines based on analysis of the collected information and the investigation rules whether at least one suspicious file was identified.

FIG. 1 depicts an exemplary and non-limiting block diagram used to describe the operation of the system 100 according to an embodiment. A network 110 is used to enable communication between the different components of the system 100. The network 110 may comprise the likes of busses, a local area network (LAN), a wide area network (WAN), a metro area network (MAN), the world wide web (WWW), the Internet, a wired network, a wireless network, and the like, as well as any combination thereof. A server 120 is further connected to the network 110. The server 120 is configured to identify files' prevalence, way of spreading within the network 110, installation time pointers, etc. Thereafter the server 120 continuously monitors their operation.

A plurality of end point devices (EPD) 130-1 through 130-N, where N is an integer equal to or greater than 1, are communicatively connected to the network 110. The EPDs 130 can be, but are not limited to smart phones, mobile phones, laptops, tablet computers, wearable computing devices, personal computers (PCs), a combination thereof and the like. A plurality of agents 135-1 through 135-M are installed on the EPDs 130 and are further connected to the network 110. The system 100 may further include a database 140 designed to store therein data associated with a plurality of files and metadata related thereto.

According to an embodiment, the server 120 collects over the network 110 at least one identifier associated with each file of a plurality of files. Each file of the plurality of files is installed on at least one of the plurality of EPDs 130. The identifier is a unique data item such as the file's name, the file's creation time, a combination thereof, etc. that allows to differentiate between different files or processes. The identifier is the same for each like file of the plurality of files. That is to say, in case the same file is installed on five different EPDs 130, the five files have the same identifier.

The server 120 determines a prevalence of each file of the plurality of files based on the collected identifiers. The prevalence of each file may be determined based on calculation of the total amount of files installed on the plurality of EPDs 130 that are communicatively connected by the network 110. For example, an identifier, such as a file's name, of 20 files installed on 20 different EPDs 130 may be identical. According to the same example, the network 110, to which the 20 EPDs 130 are communicatively connected, further comprises 1,500 more EPDs 130 connected thereto. Hence, the prevalence of 20 out of 1,520 EPDs may be determined as relatively low.

Then, the server 120 identifies a subset of files of the plurality of files that have a prevalence that is below a predetermined threshold. The predetermined threshold is a standard that may be changed according to the total amount of EPDs 130 in the network 110. That is to say, if the total amount of the EPD 130 is 100, a low prevalence may be 20 or less files that are installed on, for example, 20 EPDs. Thus, the predetermined threshold for that matter is 20. The low prevalence represents a first indication for identifying a suspicious file existence. In case certain files or processes are installed only on a small amount of EPDs 130 out of a larger amount of EPDs 130 that are communicatively connected to for example, an enterprise network, it may be an initial indication that these files or processes are malicious.

Then, the server 120 collects information associated with the identified subset of files. The information may be indicative of a time at which the at least one file was installed on one or more of the plurality of EPDs 130, the way the at least one file spread within the network 110, etc. The information may be metadata associated with each of the identified subset of files.

For example, after the server 120 identifies 20 identical files that have a prevalence that is below a predetermined threshold, the server 120 collects information that indicates that the files were initially installed on the marketing department EPDs 130 and thereafter on the information technology (IT) department EPDs 130. According to another example, the server 120 may collect information that indicates that the first file of 20 identical files was installed on Jan. 1, 2017 at 6 am on a first EPD, and the remaining 19 were simultaneously installed one month later on 19 other EPDs.

According to further embodiments the information, i.e. the metadata, associated with each of the identified subset of files may be indicative of the attribution of the EPD 130 on which the file is installed. That is to say, the information indicates whether the EPD 130 on which the subset of files were installed relates to marketing department, IT department, etc.

Then, the server 120 analyzes the collected information with respect of a set of computerized investigation rules (CIR). The set of CIR may include guidelines that facilitate to determine whether at least one file of the identified subset files is a suspicious file. For example, the CIR may determine that in case a file of the identified subset of files was initially installed on an EPD 130 related to the enterprise marketing department, the file is suspicious. In an embodiment, the CIR may be predetermined.

As another example, the CIR may determine that if one of the identified subset of files was initially installed on one of the EPDs 130 associated with the IT department and thereafter spread to three or more EPDs 130 related to the marketing department, the file is not suspicious. According to the same example, the CIR may determine that in case the three or more EPDs 130 to which the files were spread are associated with one of the chief financial officer (CFO), the chief technical officer (CTO), or the chief executive officer (CEO), the file is suspicious.

Then, the computing device 120 determines, based on the analysis of the collected information and the set of CIR, whether the at least a file of the identified subset of files is a suspicious file. For example, a certain file has a prevalence that is below a predetermined threshold and the information related thereto indicates on certain parameters, such as installation time, spreading schema, etc. that when analyzed with the CIRs may indicate that the at least a file is a suspicious file.

According to one embodiment, the server 120 may be configured to generate an alert, notification, etc. based on the determination that a suspicious file has been identified within the network 110, e.g. an enterprise network. According to another embodiment, a risk score associated with the at least a file of the subset of files may be generated based on the collected information, i.e. metadata associated with the at least a file and the prevalence related thereto. For example, if the prevalence is below the predetermined threshold and the collected information indicates that the file was installed on four EPDs 130 related to the marketing department, the risk score may be relatively low. According to the same example, if the prevalence is below the predetermined threshold and the collected information indicates that the file was installed on one single EPD 130 related to the IT department, the risk score may be relatively high.

Figure 2:
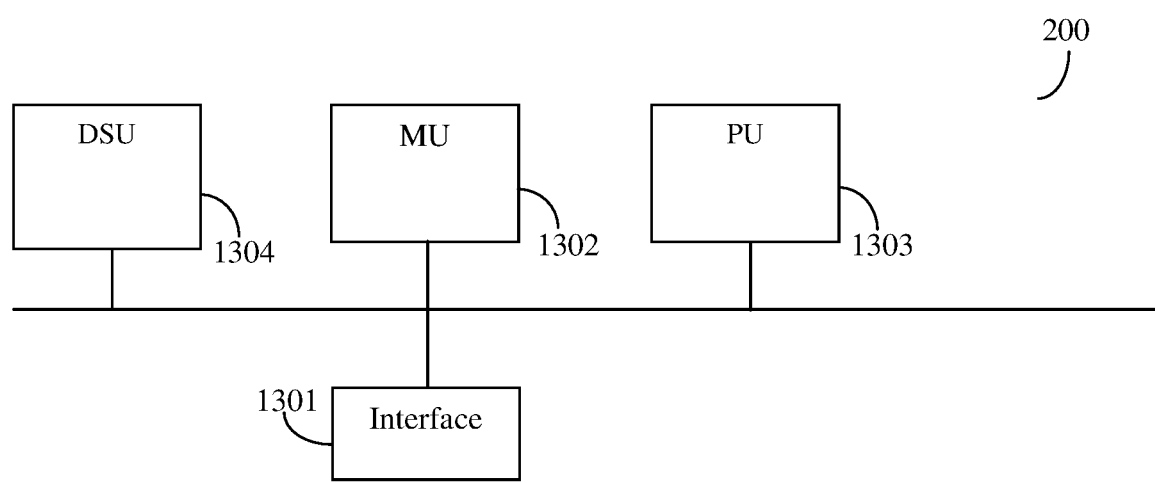
FIG. 2—is a schematic diagram of an apparatus used to describe the operation of the system according to an embodiment.

FIG. 2 is an exemplary and non-limiting schematic diagram 200 of the server 130 according to an embodiment. The server 120 includes an interface 1301 to the network 120 by which the server 120 sends and receives data over the network 110. The server 120 further includes a memory unit (MU) 1302. The MU 1302 contains therein instructions that when executed by a processing unit (PU) 1303 configure the server 120 to operate as further described herein below.

According to an embodiment, upon collecting via the interface 1301 identifiers associated with each file of a plurality of files associated with at least one end points device (EPD) 130 coupled to the network 110, the PU 1303 determines a prevalence of each file of the plurality of files. Each file of the plurality of files is installed on at least one of the plurality of EPDs 130 and the identifier is the same for each like file of the plurality of files. In an embodiment the file may be, a process, a folder, etc. Alternatively, the plurality of files may be proactively fetched by the server 120.

Subsequently, a subset of files of the plurality of files that have a prevalence that is below a predetermined threshold is identified by the server 120. Then the server 120 collects information associated with the identified subset of files, the information indicates at least a time at which the at least one file was installed on one or more of the plurality of EPDs 130 and the way the at least one file spread within the network 110.

Thereafter the collected information is analyzed by the PU 1303 with respect of a set of predetermined computerized investigation rules (CIR) as further described herein above below with respect of FIG. 1. The server 120 further includes a data storage unit (DSU) 1304 for storing identifiers, information, CIRs, and data corresponding to the prevalence of each file.

Then, based on the analysis of the collected information and the set of predetermined CIRs the server determines whether at least a file of the identified subset files is a suspicious file. According to an embodiment, the PU 1303 may generate an alert and, for example, send the alert to a predetermined EPD 130, store the alert in the DSU 1304, a combination thereof, etc.

Figure 3:
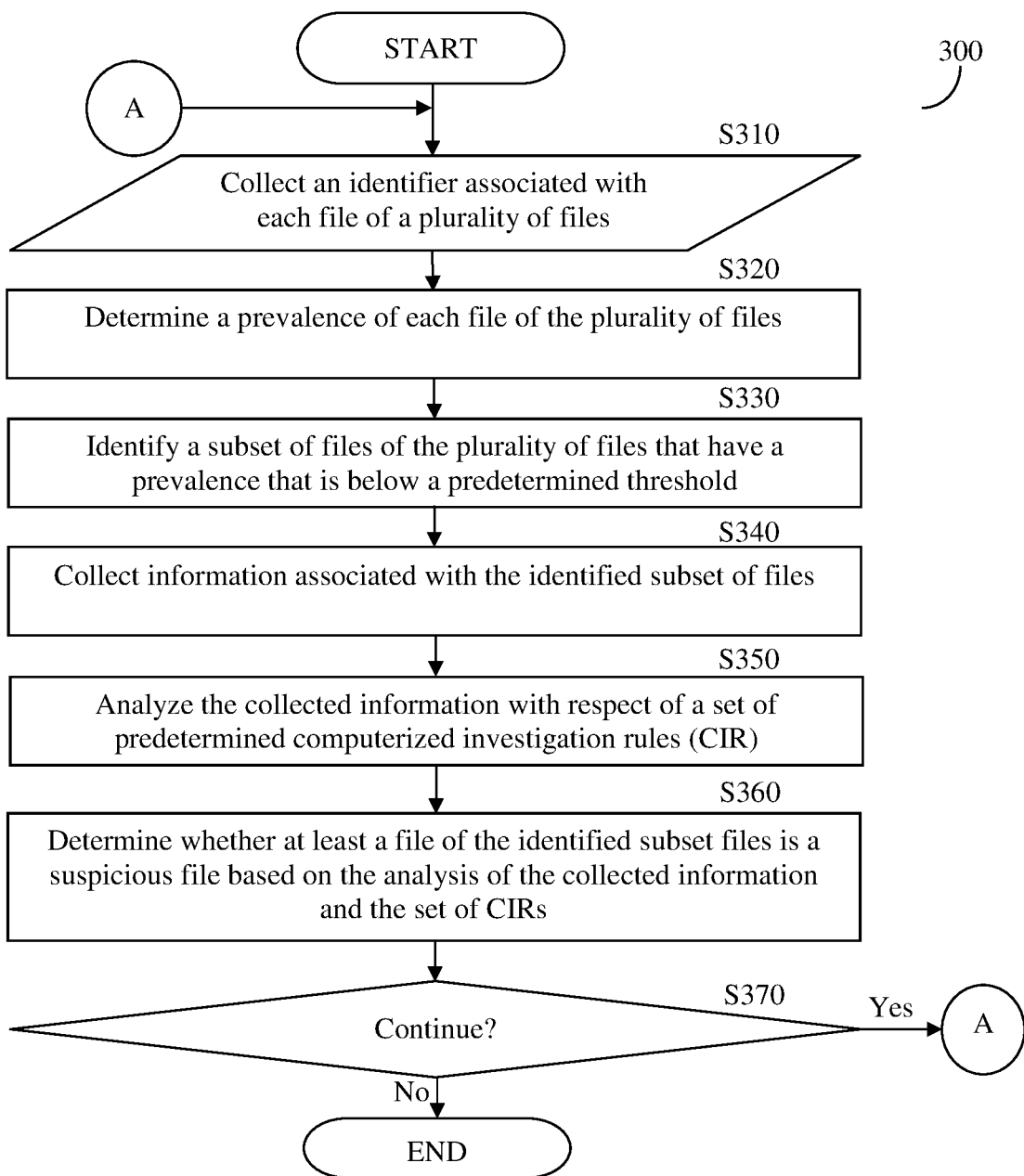
FIG. 3—is a flowchart describing a method for logical identification of malicious threats across a plurality of end-point devices (EPD) communicatively connected by a network, according to an embodiment; and, FIG. 4—is a flowchart describing a method for logical identification of a root cause of malicious threats across a plurality of end-point devices (EPD) communicatively connected by a network according to an embodiment.

FIG. 3 is an exemplary and non-limiting flowchart 300 describing a method for logical identification of malicious threats across a plurality of end-point devices (EPD) communicatively connected by a network, according to an embodiment. At S310, the operation starts when data associated with an identifier associated with each file of a plurality of files is received by the server 120. Each file of the plurality of files is installed on at least one of the plurality of EPDs 130 and wherein the identifier is the same for each like file of the plurality of files.

At S320, a prevalence of each file of the plurality of files is determined based on the collected identifiers as further described herein above with respect of FIG. 1. At S330, a subset of files of the plurality of files that have a prevalence that is below a predetermined threshold is identified.

At S340, information associated with the identified subset of files is collected by the server 120. The information may be indicative of a time at which the at least one file was installed on one or more of the plurality of EPDs 130, the way the at least one file spread within the network 110, etc.

At S350, the collected information is analyzed with respect of a set of predetermined computerized investigation rules (CIR) as further described herein above with respect of FIG. 1. At S360, the server 120 determines based on the analysis of the collected information and the set of predetermined CIRs whether at least a file of the identified subset files is a suspicious file. At S370, it is checked whether to continue the operation and if so, execution continues with S310; otherwise, execution terminates.

Figure 4:
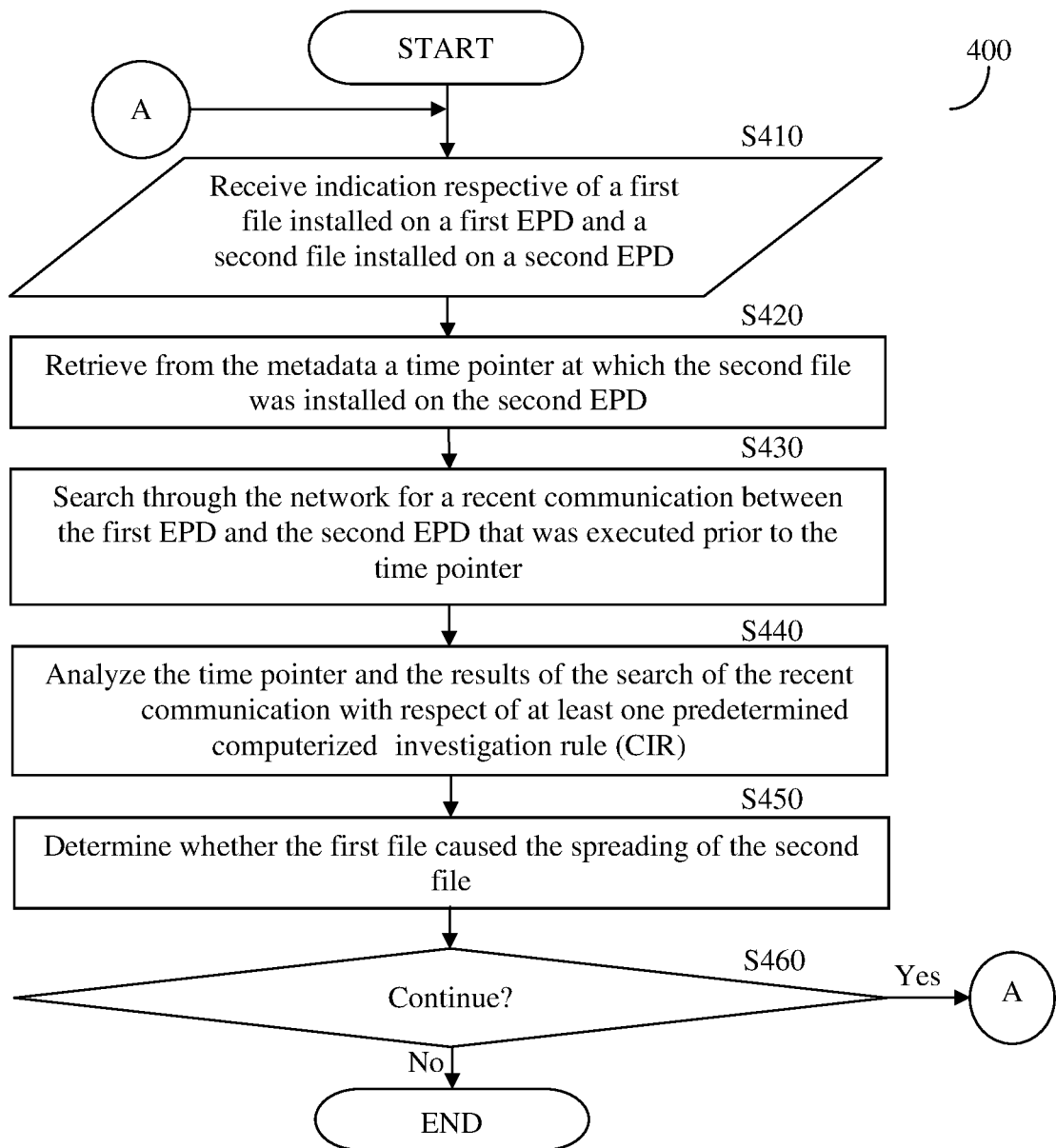

FIG. 4 depicts a flowchart of a method for logical identification of a root cause of malicious threats across a plurality of end-point devices (EPD) communicatively connected by a network. At S410, an indication corresponding to a first file installed on a first EPD 130-1 and a second file installed on a second EPD 130-2 is received. The first file and the second file are identical and having an identical prevalence which is below a predetermined threshold. The indication includes at least metadata associated with each of the first file and the second file. The second file is installed on the second EPD 130-2 after the first file is installed on the first EPD 130-1. The metadata may be indicative of, for example, time pointers at which the files were installed, files type, size, location, etc. The low prevalence of the first file and the second file indicates that these files have a potential to be suspected files.

At S420, a time pointer at which the second file was installed on the second EPD 130-2 may be retrieved from the metadata by the server 120. At S430, the server 120 searches through the network 110 for a recent communication between the first EPD 130-1 and the second EPD 130-2 that was executed prior to the time pointer. That is to say, in case the second file was installed on the second EPD 130-2 on Sunday 8 am, the server searches for the latest communication, between the first EPD 130-1 and the second EPD 130-2, that was executed before 8 am. The search results may be indicative of the communication type, the communication length, etc. For example, the results may indicate that the communication between the first EPD 130-1 and the second EPD 130-2 included file sharing.

At S440, the server 120 may be configured to analyze the time pointer and the results of the search of the recent communication with respect of at least one predetermined computerized investigation rule (CIR). The at least one CIR may include guidelines that facilitate to determine whether the first file caused the spreading of the second file. For example, the CIR may determine that in case the second file was installed on the second EPD 130-2 at 10 am and the communication between the first EPD 130-1 and the second EPD 130-2 relates to file sharing, the first file is determined to be a suspicious file.

At S450, the server 120 determines based on the analysis whether the first file caused the spreading of the second file, i.e. whether the first file is a suspicious file. According to one embodiment, the first file may represent a root cause by which the malware invaded the network. According to another embodiment, the server 120 may continue the operation described herein above, i.e. executing this method through multiple EPDs 130 until the root cause is identified. According to another embodiment, after the suspicious file is identified, the server 120 may collect and analyze metadata associated with the suspicious file in order to identify the invasion pattern. The invasion pattern may include the time where the first file was installed on the network 110, the EPD 130 that enabled the installation, the steps made by the user of the EPD prior to the installation, etc. At S460, it is checked whether to continue the operation and if so, execution continues with S410; otherwise, execution terminates.

The principles of the invention are implemented as hardware, firmware, software, or any combination thereof. Moreover, the software is preferably implemented as an application program tangibly embodied on a program storage unit or computer readable medium.

The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code.

The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the invention may be achieved without departing from the scope of the disclosed invention. All such embodiments are included herein. The scope of the invention should be limited solely by the claims thereto.

What is claimed is:

1. A method comprising:
    collecting over a network a plurality of identifiers for a plurality of files, wherein each file of the plurality of files is installed on at least one of a plurality of end-point devices (EPDs) of the network;
    determining that a first file installed on a first EPD of the plurality of EPDs and a second file installed on a second EPD of the plurality of EPDs have a same identifier;
    retrieving a time pointer at which the second file was installed on the second EPD;
    searching the network for a communication between the first EPD and the second EPD that was executed prior to the time pointer and that corresponds to installation of the second file;
    based on results of the search for the communication between the first EPD and the second EPD indicating that the communication between the first EPD and the second EPD was executed prior to the time pointer and corresponds to installation of the second file, searching the network for communications among the plurality of EPDs corresponding to installation of a subset of the plurality of files having the same identifier;

determining that the first file has a prevalence that satisfies a prevalence threshold, wherein the prevalence of the first file is based on a number of files in the subset of the plurality of files with the same identifier; and, indicating that the first file is a suspicious file based, at least in part, on the determination that the prevalence of the first file satisfies the prevalence threshold.

2. The method of claim 1, wherein determining that the first file of the plurality of files has a prevalence that satisfies the prevalence threshold comprises determining that the number of files in the subset of the plurality of files with the same identifier is below the prevalence threshold.

3. The method of claim 1, wherein determining the first file has a prevalence that satisfies a prevalence threshold is based, at least in part, on at least one of spreading schema and installation times.

4. The method of claim 1, further comprising:
continuously monitoring information associated with each file of the plurality of files with prevalence that satisfies the prevalence threshold.

5. The method of claim 1, further comprising:
generating a risk score based on the indication that the first file is a suspicious file.

6. An apparatus comprising:
an interface to a network;
a processing unit;
a memory coupled to the processing unit, the memory containing therein instructions that when executed by the processing unit cause the apparatus to:
collect over the network a plurality of identifiers for a plurality of files, wherein each file of the plurality of files is installed on at least one of a plurality of end-point devices (EPDs) of the network;
determine that a first file installed on a first EPD of the plurality of EPDs and a second file installed on a second EPD of the plurality of EPDs have a same identifier;
retrieve a time pointer at which the second file was installed on the second EPD;
search the network for a communication between the first EPD and the second EPD that was executed prior to the time pointer and that corresponds to installation of the second file;
based on results of the search for the communication between the first EPD and the second EPD indicating that the communication between the first EPD and the second EPD was executed prior to the time pointer and corresponds to installation of the second file, search the network for communications among the plurality of EPDs corresponding to installation of a subset of the plurality of files having the same identifier;
determine that the first file has a prevalence that satisfies a prevalence threshold, wherein the prevalence of the first file is based on a number of files in the subset of the plurality of files with the same identifier; and,
indicate that the first file is a suspicious file based, at least in part, on the determination that the prevalence of the first file satisfies the prevalence threshold.

7. The apparatus of claim 6, wherein the instructions comprise instructions executable by the processing unit to cause the apparatus to continuously monitor information associated with files in the plurality of files having prevalence satisfying the prevalence threshold.

8. The apparatus of claim 6, wherein the instructions comprise instructions executable by the processing unit to cause the apparatus to generate a risk score based on the indication that the first file of the plurality of files is a suspicious file.

9. A non-transitory computer-readable medium having program code stored thereon that, when executed by a processor, causes the processor to:
determine that a first file installed on a first end-point device (EPD) and a second file installed on a second EPD have a same identifier, wherein the first EPD and second EPD are on a network comprising a plurality of EPDs;
retrieve a time pointer at which the second file was installed on the second EPD;
search the network for a communication between the first EPD and the second EPD that was executed prior to the time pointer and that corresponds to installation of the second file;
based on results of the search for the communication between the first EPD and the second EPD indicating that the communication between the first EPD and the second EPD was executed prior to the time pointer and corresponds to installation of the second file, search the network for communications among the plurality of EPDs corresponding to installation of a subset of the plurality of files having the same identifier;
determine that the first file has a prevalence that satisfies a prevalence threshold, wherein the prevalence of the first file is based on a number of files in the subset of the plurality of files with the same identifier; and,
determine that the first file is suspicious based, at least in part, on the determination that the prevalence of the first file satisfies the prevalence threshold.

10. The computer-readable medium of claim 9, wherein the second file was installed on the second EPD after the first file was installed on the first EPD.

11. The method of claim 1, wherein indicating that the first file is a suspicious file is based, at least in part, on one or more computerized investigation rules (CIRs).

12. The method of claim 11, wherein the one or more CIRs are based, at least in part, on at least one of technical personnel and departments associated with the subset of the plurality of EPDs.

13. The apparatus of claim 6, wherein the instructions executable by the processing unit to cause the apparatus to indicate that the first file is a suspicious file comprise instructions to analyze information about installation and spreading of the first file in the network according to one or more computerized investigation rules (CIRs).

14. The apparatus of claim 13, wherein the information about the installation of the file in the network includes at least one of spreading schema and installation times.

15. The apparatus of claim 13, wherein the one or more CIRs are based, at least in part, on metadata associated with the plurality of EPDs.

16. The computer-readable medium of claim 9, wherein the program code executable by the processor to cause the processor to determine that the first file is suspicious comprises program code executable by the processor to cause the process to determine that the first file is suspicious based, at least in part, on one or more computerized investigation rules (CIRs).

17. The computer-readable medium of claim 9, having further program code stored thereon that when executed by the processor causes the processor to identify the first file as a root cause for malware invading the network based, at least in part, on a determination that the first file caused spreading of the second file.

18. The method of claim 11, wherein indicating that the first file is a suspicious file based, at least in part, on the one or more CIRs comprises determining that the first file caused spreading of the second file based on results of the communication between the first EPD and the second EPD that was executed prior to the time pointer.

19. The apparatus of claim 13, wherein the instructions executable by the processing unit to cause the apparatus to analyze information about installation and spreading of the first file in the network according to the one or more CIRs comprise instructions to determine that the first file caused spreading of the second file based on results of the communication between the first EPD and the second EPD that was executed prior to the time pointer.

* * * * *